Dec. 4, 1956  N. C. EATON  2,772,850
FLOW CONTROL GATE
Filed May 9, 1955
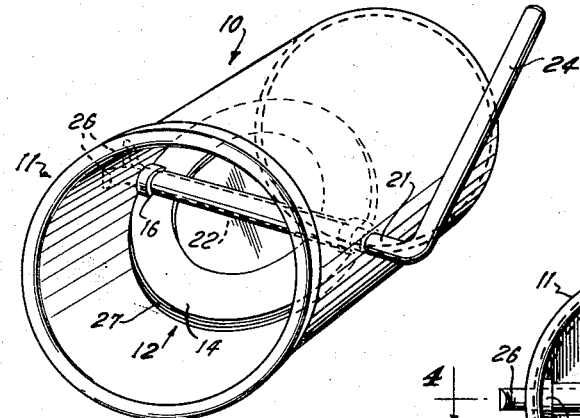
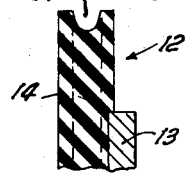
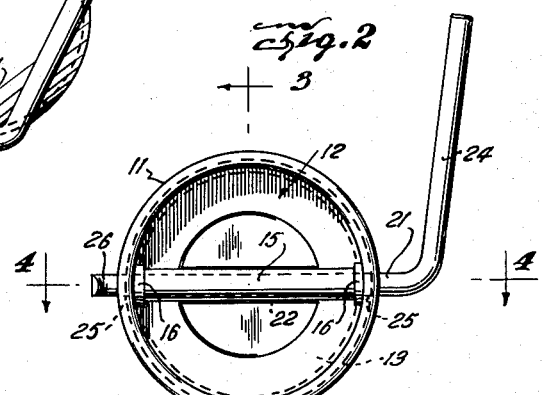
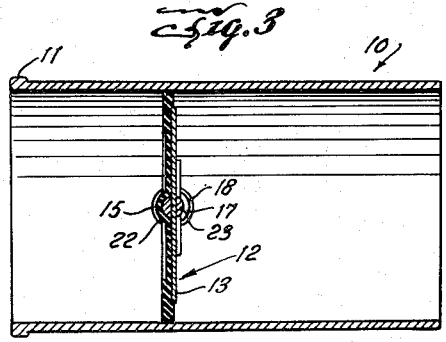
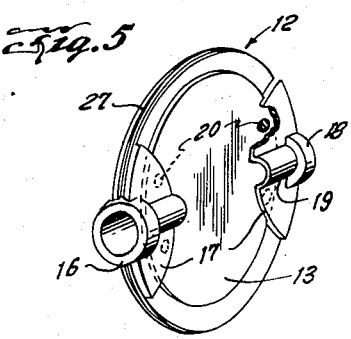
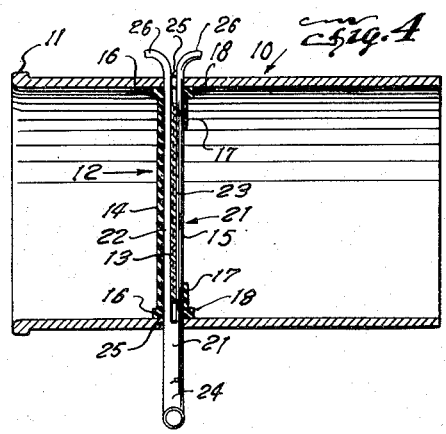
Nelson C. Eaton
INVENTOR
BY
ATTORNEY United States Patent Office 2,772,850
Patented Dec. 4, 1956

2,772,850

FLOW CONTROL GATE

Nelson C. Eaton, Lubbock, Tex.

Application May 9, 1955, Serial No. 507,072

10 Claims. (Cl. 251—306)

This invention relates to valves or gates employed in soil irrigation.

The principal object of the invention is to provide a gate adapted to be installed in the laterals of a main water conduit in order that water may be uniformly distributed between the rows of vegetation perpendicular to said main conduit. The invention seeks first: to seal the lateral against leakage of water through the medium of a gate having a rigid central area and a resilient margin whose perimeter is formed with a plurality of circumferential grooves. Second: a gate operating handle having a bifurcated right angular portion or shaft extending diametrically through the laferal or pipe and whose furcations lie one on each side of the disc. Third: integrally molded, diametrically opposed extensions on the margin of the gate jointly embracing the bifurcated shaft adjacent the openings in the pipe through which the shaft extends to seal these openings against escape of water, and fourth: a gate valve wherein replacement may be accomplished through the simple expedient of withdrawing the shaft from the pipe to release the same from the gate which can then be removed from the open end of the pipe.

Other objects will become manifest as the description proceeds when considered with the annexed drawing wherein:

Figure 1 is a perspective view of the invention.

Figure 2 is an end elevational view of the pipe and gate.

Figure 3 is a view in longitudinal section, taken on line 3—3 of Figure 2.

Figure 4 is a view in longitudinal section, taken on line 4—4 of Figure 2.

Figure 5 is a perspective view of the gate valve per se, and

Figure 6 is a fragmentary sectional view of the gate valve on a larger scale.

Gate valves in the form of discs with flexible margins and mounted for rotation in a pipe about a diametrical axis have been in use for some time but it has been found that gate valves of this type, for the most part, are frequently fouled by sand and dirt infiltrating with the irrigation water and flowing through the main supply pipe and its laterals, making the valves difficult or impossible to open and close. Moreover, conventional valves for the purpose are usually constructed in such manner that the valve shaft is not removable from the pipe, hence valve replacement can be accomplished only by removing and replacing the means, usually screws, which secure the valve to its shaft, from an end of the pipe in which the valve is to function. Farmers find this practice difficult and time consuming, hence the invention anticipates a valve in which there are no screws and can be quickly replaced through the simple expedient of withdrawing the shaft from the pipe which releases the valve for removal from the open end of the pipe.

Continuing with a more detailed description of the drawing, reference numeral 10 denotes broadly the lateral or conductor pipe which is but one of several such pipes which communicate with a main supply conduit (not shown) at longitudinally spaced intervals. The pipe 10 has an external, annular bead 11 formed on one end, leaving the inner surface or bore of the pipe smooth so that there will be no protuberance or projection which will prevent free passage of sand entrained with water passing through the pipe or cylindrical valve body 10. The annular rib 11 is adapted to retain a fabric tube (not shown) usually clamped at one end to the open end of the pipe.

The gate valve is generally indicated by reference numeral 12 and consists of a rigid disc 13 which is less in diameter than the inner diameter of the pipe 10. To one face of the disc 13 is vulcanized or otherwise affixed a valve member 14 which is preferably molded from rubber in disc form to define a diametrical hollow rib 15. Each end of the rib 15 is enlarged into a semi-circular flange 16 to which further and more detailed reference will be made presently. Complementing the rubber disc 14 and vulcanized to the opposite side of the rigid disc 13 is a pair of rubber segments 17, each of which has a semi-circular flange 18 formed on the outer end of a hollow rib 19 molded integrally with the segment 17. The rubber facing or disc 14 and the segments 17 are vulcanized to the metal disc 13 at the same time, hence the flanges 16 of the rib 15 of the rubber disc 14 are in register with and vulcanized to the flanges 18 of the segments 17 to form ferrules whose outer ends protrude slightly beyond the perimeter of the rubber disc or valve member 14, for the reason to be explained later. In order to further anchor the rubber disc 14 and the rubber segments 17 to the plate or disc 13, the latter is formed with a plurality of holes 20 (Figure 5) through which the rubber flows from one side to the other of the plate 13, joining these elements together to form an integral body.

The valve 12 is mounted in the pipe 10 on a shaft 21 which is bifurcated or divided into two legs 22 and 23 between which the plate or disc 13 is received. The shaft 21 is part of an L-shaped rod, one leg constituting the shaft while the other leg provides a handle 24 for rotating the valve 12.

To assemble the valve in the pipe 10, the valve 12 is thrust into the open or beaded end of the pipe until the outer ends of the ferrules, combining the flanges 16 and 18, are in register with the diametrically opposed holes 25 in the pipe. The shaft 21 is then inserted in one of the holes 25 so that the legs 22 and 23 thereof will straddle the plate 13 in the manner shown. The leg 22 extends through the hollow rib 15 of the rubber disc 14 while the leg 23 of the shaft extends through the axially aligned hollow ribs 19 of the segments 17 and the ends 26 of the legs 22 and 23 will protrude through the opposite hole 25 in the pipe where they are expanded, as shown, to prevent longitudinal displacement of the shaft 21.

Referring again to the flanges 16 and 18 on the disc 14 and segments 17, respectively; the purpose of extending these flanges past the perimeter of the valve is to insure positive sealing of the diametrically opposed shaft holes 25, the rubber flowing about the shaft 21 at points where it passes through the holes, closing the same against escape of water when the valve 12 is closed.

As a further seal against seepage of water past the valve 12 in closed position thereof, it is noted in Figure 6 particularly that the rubber disc 14 is provided with an annular groove 27. This groove makes for greater flexibility of the periphery of the disc 14 and for better sealing efficiency.

When it becomes necessary to replace a worn valve 12, it is only necessary to bring the expanded ends 26 of the legs 22 and 23 of the shaft 21 together, pull the shaft from the pipe and remove the now free valve 12 from the open end of the pipe 10.

Manifestly, the construction as shown and described is capable of some modification and such modification as may be construed to fall within the scope and meaning of the appended claims is also considered to be within the spirit and intent of the invention.

What is claimed is:

1. A flow control valve including a cylindrical body having diametrically opposed holes therein, a bifurcated shaft extending through said holes and said body, a rigid disc interposed between the furcations of said shaft and of a diameter less than the inner diameter of said body, a disc of resilient material of a diameter substantially equal to the inner diameter of said body affixed to one face of said rigid disc and whose perimeter is in sealing engagement with said body in closed position of said valve, said resilient disc having a hollow diametrical rib receiving one furcation of said shaft, a pair of diametrically opposed resilient segments on the opposite face of said rigid disc receiving the companion furcation of said shaft, means integral with said resilient disc and said segments for sealing the openings in said body about said shaft, means for actuating said shaft to open and close said valve and means for precluding longitudinal displacement of said shaft.

2. A flow control valve including a cylindrical body having a smooth bore, a circular plate smaller in diameter than said bore, a resilient disc of greater diameter than said plate and bonded to one face thereof in concentric relationship, said disc having a hollow, diametrical rib and adapted to be brought into circumferential sealing engagement with the walls of said bore in closed position of said valve, a bifurcated shaft extending through diametrically opposed matching holes in said body, the furcations of said shaft lying one on each side of said plate, one of said furcations extending through said hollow rib, resilient means affixed to the opposite face of said plate, said resilient disc and said resilient means having semi-circular flanges defining annular sealing means for the matching holes in said body and means for rotating said shaft to open and close said valve.

3. The structure of claim 2 wherein said resilient disc is formed with a peripheral groove to increase the flexibility of the margin of said disc.

4. The structure of claim 2 wherein said plate is provided with a plurality of openings through which said resilient means on one face of said plate is bonded to the resilient disc on the opposite face of said plate.

5. A flow control valve comprising a tubular body having a smooth bore, a longitudinally split shaft extending through diametrically opposed, matching holes in said tubular body, a circular valve element of resilient material having a rigid plate bonded thereto whose edges are spaced inwardly of the perimeter of said valve element, said plate being disposed in the split of said shaft to be rotated thereby to bring the perimeter of said resilient valve member into and out of frictional engagement with the walls of said bore and means for actuating said shaft.

6. The structure of claim 5, and resilient means embracing said shaft adjacent said matching holes for sealing said holes against leakage.

7. The structure of claim 5 wherein the split ends of said shaft exteriorly of said tubular body are spread apart to preclude longitudinal displacement of said shaft.

8. In a flow control valve, a tubular valve housing having a smooth bore and diametrically opposed matching holes, a longitudinally split shaft journaled in said holes having an integral operating handle, a resilient disc whose diameter is slightly greater than that of said bore for sealing the same in closed position of said valve, a rigid plate frictionally retained in the split of said shaft and bonded to said resilient disc and whose diameter is less than that of said disc and means holding said shaft against longitudinal displacement in said body.

9. The structure of claim 8, and resilient means sealing the diametrically opposed matching holes in said tubular body.

10. The structure of claim 8 wherein said resilient disc is peripherally grooved.

References Cited in the file of this patent

UNITED STATES PATENTS

| 926,174 | Clark | June 29, 1909 |
| 2,385,510 | Harwood | Sept. 25, 1945 |
| 2,441,252 | Sarver | May 11, 1948 |
| 2,612,829 | Joyce | Oct. 7, 1952 |
| 2,676,040 | Dalton | Apr. 20, 1954 |

FOREIGN PATENTS

| 340,149 | Germany | of 1921 |